United States Patent
Suzuki

(10) Patent No.: US 7,228,413 B1
(45) Date of Patent: Jun. 5, 2007

(54) DATA TRANSMITTING/RECEIVING METHOD AND ITS RECEIVER

(75) Inventor: Hidekazu Suzuki, Yamatokoriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/554,009

(22) PCT Filed: Sep. 10, 1999

(86) PCT No.: PCT/JP99/04924

§ 371 (c)(1),
(2), (4) Date: Jun. 27, 2000

(87) PCT Pub. No.: WO00/16555

PCT Pub. Date: Mar. 23, 2000

(30) Foreign Application Priority Data

Sep. 11, 1998 (JP) ................... 10-258821

(51) Int. Cl.
*H04L 9/00* (2006.01)
*H04N 7/167* (2006.01)
*H04K 1/00* (2006.01)
*G06Q 99/00* (2006.01)
*H04N 5/262* (2006.01)

(52) U.S. Cl. ............ 713/162; 380/10; 380/20; 380/2; 380/240; 380/241; 380/242; 705/1; 705/50; 705/51; 705/52; 348/239; 348/706; 725/31; 725/139

(58) Field of Classification Search ............ 380/10, 380/20, 21, 23, 9, 21.49, 240–242, 210, 2; 705/1, 50–52; 713/162; 348/10, 706, 239; 725/31, 139
See application file for complete search history.

(56) References Cited

U.S. PATENT DOCUMENTS

| 4,531,020 | A |   | 7/1985 | Wechselberger et al. |
| 4,998,278 | A | * | 3/1991 | Sasa ..................... 380/239 |
| 5,029,207 | A |   | 7/1991 | Gammie et al. |
| 5,420,866 | A |   | 5/1995 | Wasilewski et al. |
| 5,420,923 | A | * | 5/1995 | Beyers et al. ............ 380/234 |
| 5,606,611 | A | * | 2/1997 | Kitada ..................... 380/216 |

(Continued)

FOREIGN PATENT DOCUMENTS

EP  0 817 485 A  1/1998

(Continued)

OTHER PUBLICATIONS

Tu et al., 'On Key Distribution management for Conditional Access System On Pay-TV System', Feb. 1999, IEEE Transaction on Consumer Electronics vol. 45, pp. 151-158.*

Primary Examiner—Ayaz Sheikh
Assistant Examiner—Shin-Hon Chen
(74) Attorney, Agent, or Firm—Steptoe & Johnson LLP

(57) ABSTRACT

A data transmitting/receiving method for charging the reception of pay data in units of a reception or in units of a group to which receivers belong with a high degree of freedom and its receiver. The transmission side allocates the same group identification number (IRD_Gr_ID) to receivers which receive data from the transmission side under a reception contract, have different individual identification numbers (IRD_ID), and belong to the same group, and manages the reception contract by means of the individual identification number (IRD_ID) and the group identification number (IRD_Gr_ID).

9 Claims, 6 Drawing Sheets

U.S. PATENT DOCUMENTS

| | | | |
|---|---|---|---|
| 5,710,815 A * | 1/1998 | Ming et al. | 380/241 |
| 5,787,171 A * | 7/1998 | Kubota et al. | 380/239 |
| 5,901,339 A * | 5/1999 | Saito | 725/5 |
| 5,917,915 A * | 6/1999 | Hirose | 380/228 |
| 5,932,863 A * | 8/1999 | Rathus et al. | 235/462.15 |
| 6,188,871 B1 * | 2/2001 | Kitamura et al. | 725/120 |
| 6,256,493 B1 * | 7/2001 | Dorenbosch et al. | 455/419 |
| 6,289,314 B1 * | 9/2001 | Matsuzaki et al. | 705/1 |
| 6,347,400 B1 * | 2/2002 | Ohkura et al. | 725/60 |
| 6,349,140 B1 * | 2/2002 | Ushiyama | 380/210 |
| 6,760,382 B1 * | 7/2004 | Mizobata | 375/259 |

FOREIGN PATENT DOCUMENTS

| | | |
|---|---|---|
| JP | 4-362887 | 12/1992 |
| WO | 94/19909 | 9/1994 |
| WO | WO 97/04553 A | 2/1997 |

* cited by examiner

Fig.1 (a)

| EMM section header | IRD_ID | IRD_Gr_ID | ...... | CRC_32 |

1EMM section

Fig.1 (b)

| EMM section header | IRD_ID | IRD_Gr_ID | ...... | IRD_ID | IRD_Gr_ID | ...... | CRC_32 |

1EMM section

IRD_Gr_ID=100
list of contract channels
101Ch
105Ch
208Ch
301Ch
. . . . . . .

IRD_ID=1000
list of contract channels
103Ch
125Ch
258Ch
309Ch
. . . . . . .

Fig.5

```
61 ─── PPV_Group_descriptor(){
           descriptor_tag
           descriptor_length
62 ───    Group_flag
           }
```

DATA TRANSMITTING/RECEIVING METHOD AND ITS RECEIVER

TECHNICAL FIELD

The present invention relates to a data transmission and reception method in which accounting is performed according to the content of a contract, on fee-charged data received in a data transmission and reception system, and a receiver used for the method.

BACKGROUND ART

In the existing cable TV and satellite broadcasting, a fee-charging broadcasting system is employed.

As for accounting in the fee-charging broadcasting system, there are, for example, "pay-per-channel" in which the viewer pays a fixed charge for a specific channel every month to watch the channel, and "pay-per-view" in which a charge is set for each program and the viewer pays the charges of programs he/she has watched.

These charges are collected as follows. In the accounting system like pay-per-channel, after the viewer has made a contract of viewing a specific channel, a fixed charge for the channel is automatically collected by direct debit from a specified account. On the other hand, in the accounting system like pay-per-view, the transmitting end gets the history of viewing such as the title and time of a program the viewer has watched, and collects a charge according to the history of viewing. In order to get the history of viewing, the following methods have been employed: a method of transmitting the history of viewing and an IRD_ID which is an ID for identifying an IRD (Integrated Receiver Decoder) used for the viewing, from the receiving end to the transmitting end through a bidirectional cable; and a method of recording the history of viewing in an IC card, and periodically transmitting the history of viewing and a Card_ID which is an ID for identifying the IC card, to the transmitting end through a telephone line.

Accordingly, as for the contract system, regardless of the accounting system, i.e., not only in pay-per-view but also in pay-per-channel, a contract is made for each IRD and the charge is accounted and paid for each IRD. However, BS broadcasting employs an accounting system which is a kind of pay-per-channel, and a contract system in which a contract is made not for each IRD but for each family. That is, when the viewer makes a contract of viewing two channels, BS1*ch* and BS2*ch*, a charge for one contract is accounted to each family, and the charge for one contract is collected even if the family possesses two or more IRDs.

In recent years, it is not seldom that one family possesses plural TV sets, and it may safely be said that each member of a family owns a TV set. Further, the number of digital broadcasting channels is increasing. Accordingly, the number of families having plural IRDs and making contracts of viewing fee-charged broadcasts also increases. Further, because of versatility of digital broadcasting, it is expected that one company owns a large number of IRDs and utilizes fee-charged broadcasts.

Meanwhile, it is expected that the transmitting end of digital broadcasting will employ the contract system in units of groups like families or companies, as well as the existing accounting system in units of IRDs.

In the accounting system like pay-per-channel, it is possible to collect a fixed charge from each group, like in the existing BS broadcasting. In the accounting system like pay-per-view, however, the history of viewing is transmitted together with the IRD_ID or the Card_ID so that the transmitting end can grasp it in units of IRDs, not in units groups such as families or companies, each having plural IRDs.

Further, considering the versatility of undertaking in digital broadcasting and the great number of channels, it is desired that the viewer can select either the IRD-unit contract or the group-unit contract according to the carrier, channel, program, term, etc. to realize highly-flexible setting of contract systems.

The present invention is made to solve the above-described problems and it is an object of the present invention to provide a data transmission and reception method which realizes highly-flexible accounting on fee-charged data, in accordance with reception of the data in units of receivers or in units of groups each having plural receivers, and a receiver used for this method.

DISCLOSURE OF THE INVENTION

In order to solve the above-described problems, according to the present invention (aspect 1), there is provided a data transmission and reception method in which data transmitted from a transmitting end is received, on the basis of a reception contract, with plural receivers which have individual ID numbers and belong to the same group. In this method, the transmitting end assigns the same group ID number to the plural receivers, and manages the reception contract on the basis of the individual ID numbers or the group ID number. Therefore, the transmitting end can perform accounting in either contract system, i.e., the receiver-unit contract or the group-unit contract, and the receiving end can receive the data with plural receivers at the charge of one contract when the group-unit contract is adopted.

Further, according to the present invention (aspect 2), in the data transmission and reception method described in aspect 1, the reception contract is updated at regular time intervals. Therefore, the contract system can be changed between the receiver-unit contract and the group-unit contract, resulting in more flexible setting of contract.

Further, according to the present invention (aspect 3), in the data transmission and reception method described in aspect 1, the data includes video, audio, and data which are transmitted by a data stream in digital broadcasting; and the reception contract is that a predetermined accounting is performed for a predetermined portion of the data stream which has been viewed for a predetermined period of time. Therefore, highly flexible setting is realized not only in the contract system but also in the accounting system.

Further, according to the present invention (aspect 4), in the data transmission and reception method described in aspect 3, the portion of the data stream is a service (channel). Therefore, in the accounting system of pay-per-view, the group-unit contract can be adopted to collect the charge.

Further, according to the present invention (aspect 5), in the data transmission and reception method described in aspect 1, the content of the reception contract includes services which can be viewed at the receiving end and the term of the contract, and they are multiplexed in the data stream to be transmitted to the receiving end. Therefore, the receiving end can descramble the data on the basis of the content of the reception contract to receive only the viewable service.

Further, according to the present invention (aspect 6), the data transmission and reception method described in aspect 4, comprises: a first individual ID number notification step of notifying the transmitting end of the individual ID number which is possessed by a first receiver amongst the plural receivers belonging to the same group; a contract information notification step of notifying the transmitting end of ID information for identifying a service with which the first receiver makes a reception contract; an additional individual ID number notification step of notifying the transmitting end of the individual ID number of at least one additional receiver which belongs to the same group as the first receiver, and information indicating that the additional receiver and the first receiver belong to the same group; a group ID number assignment step of assigning, by the transmitting end which has received the notification, the same group ID number to the first receiver and the additional receiver; and a contract information input step of inputting the ID information of the service with which the first receiver has made the reception contract, into the additional receiver. Therefore, with respect to the service with which the first receiver has made the reception contract, plural receivers which belong to the same group as the first receiver can receive this service at the charge of one contract.

Further, according to the present invention (aspect 7), in the data transmission and reception method described in aspect 6, the first individual ID number notification step includes a step of notifying the transmitting end of a telephone line number connected to the first receiver; in the additional individual ID number notification step, the additional receiver belongs to the same group as the first receiver and is connected to the same telephone line as that connected to the first receiver; and the method further includes: an ID number notification step in which the respective receivers notify the transmitting end of their individual ID numbers and the group ID number, through the telephone line connected to the receivers, at predetermined time intervals; and a number collation step in which, at the transmitting end, the individual ID number of the plural receivers belonging to the same group and the group ID numbers, which are notified through the telephone line at predetermined time intervals, are collated with the individual ID numbers, the group ID number, and the telephone line number which have already been registered at the transmitting end. Therefore, if a receiver under the group-unit contract is not used within the group, the transmitting end can grasp this fact.

Further, according to the present invention (aspect 8), in the data transmission and reception method described in aspect 6 or 7, the contract information input step is inputting the ID information of the service with which the first receiver has made the reception contract, the ID information being transmitted from the transmitting end. Therefore, the user is saved from inputting the contract information at the receiving end, whereby input errors are avoided.

Further, according to the present invention (aspect 9), the data transmission and reception method described in aspect 7 further includes a warning step of sending a warning from the transmitting end to the receiving end when the notified numbers do not match the registered numbers in the collation step. Therefore, if the receiving end continues the breach of contract even after the warning, it is easy for the transmitting end to take action against the breach, such as abortion of services to the receiver which breaches the contract or all the receivers in the group.

Further, according to the present invention (aspect 10), in the data transmission and reception method described in aspect 6 or 7, in the group ID number assignment step, the group ID number is multiplexed in the data stream together with video and audio to be transmitted to the receiver. Therefore, the group ID number can be easily transmitted together with the data.

Further, according to the present invention (aspect 11), in the data transmission and reception method described in aspect 10, the group ID number is stored in CA (Conditional Access) EMM (Entitlement Management Message) of the data stream to be transmitted. Therefore, the group ID number can be easily transmitted in a pair with IRD_ID which has conventionally been transmitted.

Further, according to the present invention (aspect 12), in the data transmission and reception method described in aspect 6 or 7, the group ID number is transmitted through a transmission path different from the data stream, to the receiver. Therefore, the group ID number can be transmitted with higher reliability by using a transmission line having less jamming, such as a telephone line.

Further, according to the present invention (aspect 13), in the data transmission and reception method described in aspect 3, the portion of the data stream is an event (program). Therefore, in the accounting system of pay-per-view, the group-unit contract can be adopted to collect the charge.

Further, according to the present invention (aspect 14) the data transmission and reception method described in aspect 13 comprises: a first individual ID number notification step of notifying the transmitting end of the individual ID number which is possessed by the first receiver amongst the plural receivers which belong to the same group; and additional individual ID number notification step of notifying the transmitting end of the individual ID number of at least one additional receiver which belongs to the same group as the first receiver, and information indicating that this additional receiver and the first receiver belong to the same group; a group ID number assignment step of assigning, by the transmitting end which has received the notification, the same group ID number to the first receiver and the additional receiver; and a result-of-viewing notification step in which, when an event (program) has been viewed with the plural receivers which belong to the same group and have the same group ID number, the transmitting end is notified of the individual ID numbers of the plural receivers, the group ID number thereof, and the information specifying the event (program) which has been viewed. Therefore, the transmitting end confirms that the plural receivers having the same group OD number receive the same event (program), and accounts to the group for the charge of the event which has been viewed by one receiver.

Further, according to the present invention (aspect 15), in the data transmission and reception method described in aspect 14, the information specifying the event (program) includes a program ID number for identifying the event (program). Therefore, the transmitting end can know that the event received by the plural receivers are identical.

Further, according to the present invention (aspect 16), in the data transmission and reception method described in aspect 14, the group ID number assignment step includes a step of outputting information which indicates that either receiver-unit accounting or group-unit accounting is to be applied to each event (program). Therefore, when this information is displayed on the screen at the receiving end, the user can know the accounting system for the event, and change the number of the receivers to be used to view the event.

Further, according to the present invention (aspect 17), there is provided a receiver used for a data transmission and reception method in which a data stream transmitted from the transmitting end is received by plural receivers which have different individual ID numbers and belong to the same group, on the basis of a reception contract, and the transmitting end assigns the same group ID number to the plural receivers and transmits information about the reception contract for the group ID number or form the individual ID number, and manages the contract including accounting, in units of groups or receivers. This receiver comprises: storage means for storing the group ID number transmitted from the transmitting end; demultiplexing means for extracting the information about the reception contract, from the transmitted data stream; control means for analyzing the extracted information about the reception contract to recognize a receivable service, and instructing the demultiplexing means to extract key information for descrambling the receivable service, from the data stream, thereby obtaining the key information; and decoding means for descrambling the receivable service from the data stream, under control of the control means, on the basis of the information including the recognized receivable service and the extracted key information. Therefore, the user can view the service with the plural receivers belonging to the same group, at the charge of one contract.

Further, according to the present invention (aspect 18), there is provided a receiver used for a data transmission and reception method in which a data stream transmitted from the transmitting end is received by plural receivers which have different individual ID numbers and belong to the same group, on the basis of a reception contract, and the transmitting end assigns the same group ID number to the plural receivers, and manages the reception contract including accounting, in units of groups or receivers. This receiver comprises: storage means for storing the group ID number transmitted from the transmitting end; demultiplexing means for extracting the history of viewing which includes at least accounting information of an event (program) which has been viewed and information specifying the event (program), from the transmitted data stream; card means for storing the extracted history of viewing; and card interface means for transmitting the stored history of viewing, and the individual ID number and the group ID number possessed by the receiver, to an external management center. Since the receiving end can notify the control center that the same event (program) has been viewed with plural receivers which belong to the same group, the user (group) can view the event (program) for which group-unit viewing is permitted, at the charge of one receiver.

Further, according to the present invention (aspect 19), the receiver described in aspect 17 or 18 further comprises ID number notification means for notifying the transmitting end of at least the individual ID number and the group ID number of the receiver, through a telephone line connected to the receiver, at predetermined time intervals. Therefore, if a receiver under the group-unit contract is not used within the group, the transmitting end can know this fact.

BRIEF DESCRIPTION OF THE DRAWINGS

FIGS. 1(*a*) and 1(*b*) are schematic diagrams illustrating EMM (Entitlement Management Message) sections containing IRD_Gr_ID used in a data transmission and reception method according to a first embodiment.

FIGS. 2(*a*) and 2(*b*) are diagrams illustrating examples of management information lists to be transmitted from the transmitting end in the data transmission and reception method according to the first embodiment.

FIG. 5 is a diagram illustrating an example of PPV_Group_descriptor to be transmitted from the transmitting end in a data transmission and reception method according to a second embodiment.

BEST MODE TO EXECUTE THE INVENTION

Figure 3:
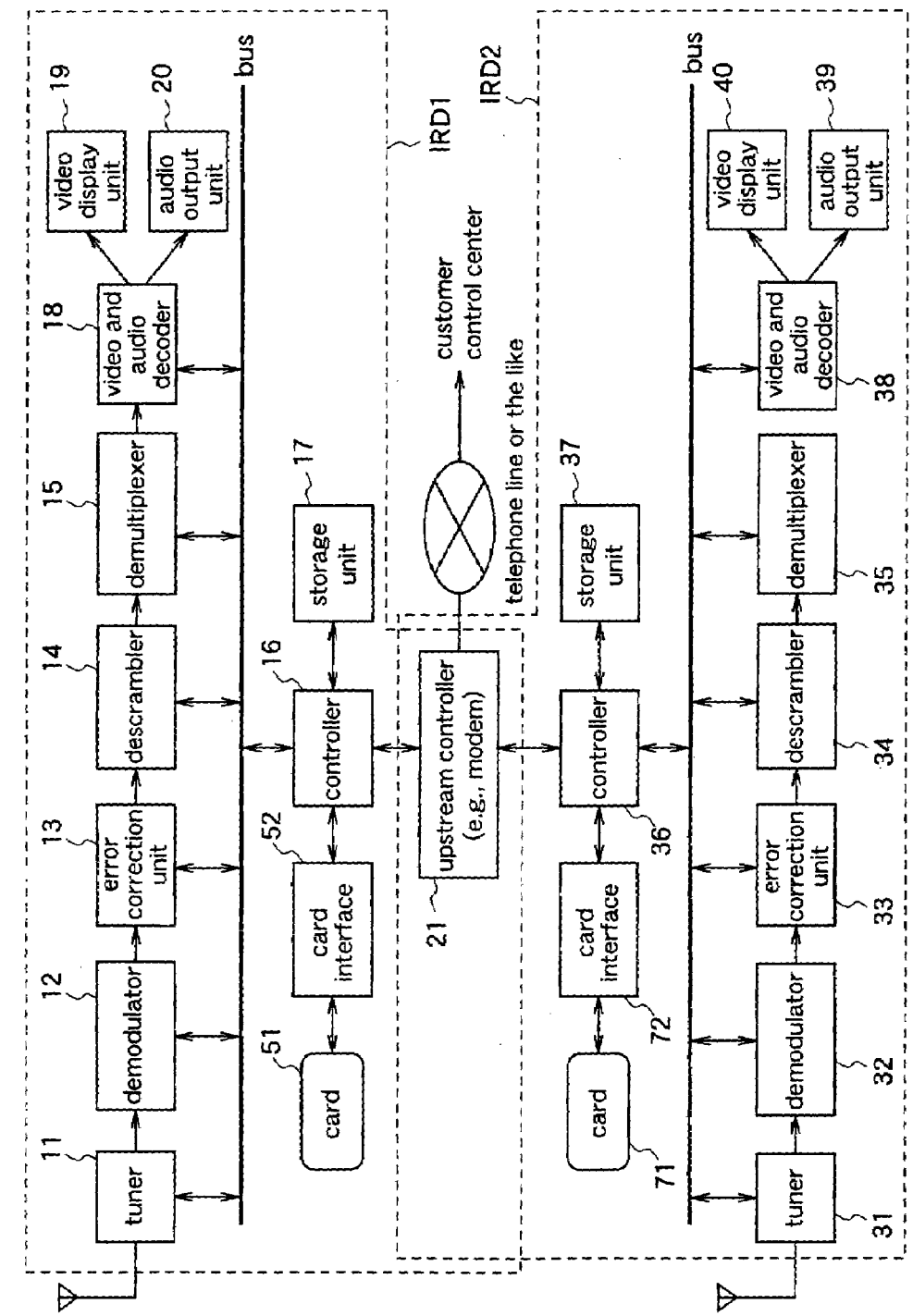
FIG. 3 is a diagram illustrating the structure of a receiver used for the data transmission and reception method according to the first embodiment.

Hereinafter, embodiments of the present invention will be described in detail with reference to the drawings.

Embodiment 1

FIGS. 1(*a*) and 1(*b*) are schematic diagrams illustrating entitlement management message (EMM) sections containing IRD_Gr_ID used in a data transmission and reception method according to a first embodiment of the present invention. More specifically, FIG. 1(*a*) shows an example where one EMM section contains only one pair of IRD_ID and IRD_Gr_ID, and FIG. 1(*b*) shows an example where one EMM section contains plural pairs of IRD_ID and IRD_GR_ID.

Each EMM section is defined by MPEG2 standard and includes an EMM section header as header information, IRD_ID, and CRC_32 (CRC: Cyclic Redundancy Check), in which key information to be transmitted to each viewer according to the contract of the viewer in fee-charging broadcasting, is described. Further, IRD_ID is an ID number for individually identifying a digital broadcast receiver (hereinafter, referred to as an IRD (Integrated Receiver Decoder)) possessed by each viewer. When the transmitting end outputs a set of the individual IRD_ID and the corresponding key information, the IRD at the receiving end can take only the key information directed to itself according to the IRD_ID.

In the figure, the EMM defined by MPEG2 standard further contains IRD_Gr_ID to be output. In the case where one group such as a family or a company possesses two or more IRDs, this IRD_Gr_ID is a group ID number for identifying the group, and these IRDs are assigned the same IRD_GR_ID. Since these IRDs are assigned the respective IRD_ID as well, these IRDs can be identified not only in the group unit but also in the IRD units.

FIGS. 2(*a*) and 2(*b*) are diagrams illustrating examples of management information lists to be transmitted from the transmitting end in the data transmission and reception method according to the first embodiment of the invention.

These management information lists are included in the EMM section to be transmitted.

The management information list A shown in FIG. 2(*a*) is an example in the case where the group-unit contract is employed in the accounting system of pay-per-channel. That is, one contract is made with a group having IRD_Gr_ID=100, for channels 101CH, 105CH, 208CH, 301CH, etc., under the accounting condition that the monthly charge per CH is 1000 yen. One the management information list A, the contract channels which can be viewed with the IRDs having each group ID number at listed, and each of the IRDs which has received the management information list A can recognize the channels listed on the management data list with the group ID number of itself, as the contract channels.

Further, the management information list B shown in FIG. 2(*b*) is an example in the case where the IRD-unit contract is employed in the accounting system of pay-per-channel. That is, one contract is made with an IRD having IRD_ID=1000, for channels 103CH, 125CH, 258CH, 309CH, etc., under the accounting condition that a fixed charge per CH is charged for a predetermined period of time (per day, month, or year).

FIG. 3 is a block diagram illustrating receivers used in the data transmission and reception method according to the first embodiment of the present invention.

In the figure, 11 and 31 denote tuners for receiving signals of data steams transmitted by digital broadcasting. 12 and 32 denote demodulators for demodulating digital-modulated broadcast signals. 13 and 33 denote error correction units for correcting transmission line errors by using error correction signals for correcting bit errors in digital broadcasting.

Further, 14 and 34 denote descramblers for descrambling video and audio data of the data streams which have been error-corrected in the error correction units 13 and 33, respectively, on the basis of the key information. 15 and 35 denote demultiplexers for extracting EMM sections from the data streams, and demultiplexing the video and audio data descrambled by the descramblers 14 and 34, respectively. 16 and 36 denote controllers for controlling the operations of the respective constituents. 17 and 37 denote storage units for storing IRD_Gr_ID extracted by the controllers 16 and 36 from the EMM sections extracted by the demultiplexers 15 and 35, respectively. In the storage units 17 and 37, the IRD_ID of the respective IRDs are stored. 18 and 38 denote video and audio decoders for decoding the descrambled video and audio data which have been demultiplexed by the demultiplexers 15 and 35, respectively. 19 and 39 denote video display units for displaying the video decoded by the video and audio decoders 18 and 38, respectively. 20 and 40 denote audio output units for outputting the audio decoded by the video and audio decoders 18 and 38, respectively. 21 denotes an upstream controller for periodically transmitting the IRD_ID and the IRD_Gr_ID of each IRD, from the IRD through the telephone line to the customer control center, under control of the controllers 16 and 36. 51 and 71 denote cards such as IC cards in which key information different from that included in the EMM is recorded. 52 and 72 denote card interfaces for connecting the cards 51 and 72 with the IRD bodies to transmit the data recorded in the cards 51 and 71 to the respective parts of the IRDs.

While in FIG. 3 the card interfaces 52 and 72 are low-speed interfaces, the card interfaces may be high-speed interfaces.

Figure 4:
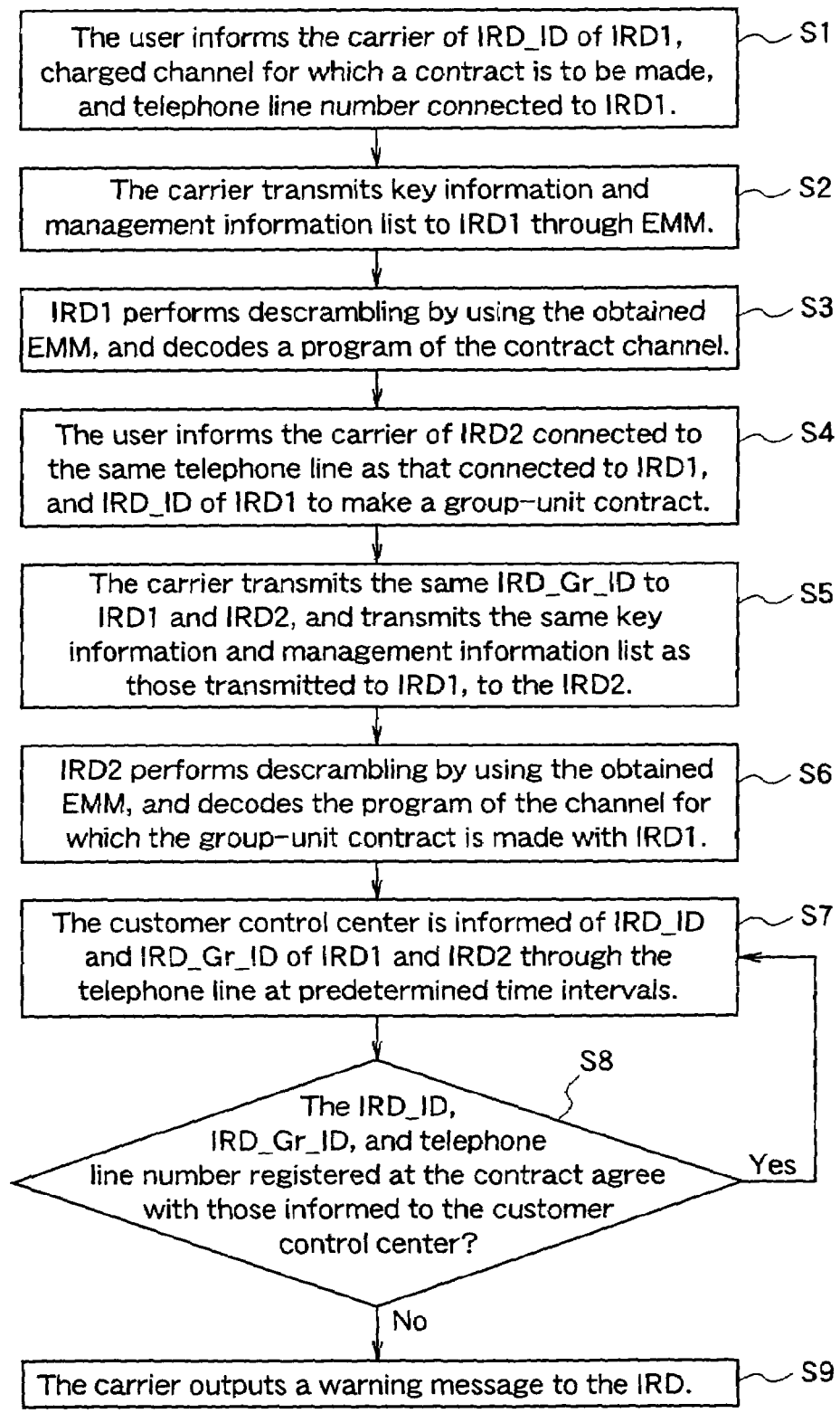
FIG. 4 is a flowchart for explaining an example of the data transmission and reception method according to the first embodiment.

FIG. 4 is a flowchart for explaining an example of the data transmission and reception method according to the first embodiment.

Hereinafter, the data transmission and reception method according to the first embodiment will be described with reference to FIGS. 1–4.

First of all, when a viewer A has brought a first IRD (IRD1), the viewer makes a contract with a carrier. At this time, the viewer A notifies the carrier of the IRD_ID of the IRD1, the fee-charged channels for which the viewer makes the contract, and the telephone line number connected to the IRD1 (step S1).

The carrier (transmitting end) transmits the EMM shown in FIG. 1(*a*) or 1(*b*) to the IRD1 (Step S2). In the EMM transmitted, the IRD-unit management information list shown in FIG. 2(*b*) and the key information are included.

The IRD1 receives, with the tuner 11, a signal of a data stream transmitted by digital broadcasting. In the IRD1, the demodulator 12 demodulates this signal, and the error correction unit 13 corrects the transmission line error by using an error correction code for correcting the bit error. The demultiplexer 15 extracts the EMM from the data stream which has been error-corrected by the error correction unit 13. The controller 16 takes the EMM to recognize the fee-charged channels (services) for which the contract is made, with reference to the management information list B, and extracts the key information from the EMM. Further, the controller 16 instructs the descrambler 14 to descramble the video and audio data of the program (event) of the contract channel (service), through the card interface 52, on the basis of the key information recorded in the card 51 and the key information extracted from the EMM. Further, the demultiplexer 15 separates the descrambled audio and video data from the data stream, and the video and audio decoder 18 decodes the separated data. The decoded video is displayed on the video display unit 19 while the decoded audio is output through the audio output unit 20. In this way, only the program of the contract channel is displayed (step S3).

When the viewer A has bought a second IRD (IRD2) while using the IRD1, the IRD2 is connected to the same telephone line as that connected to the IRD1, and the IRD-unit contract for the IRD1 is changed to the group-unit contract for the IRD1 and IRD2. At this time, not only the IRD_ID of the IRD2 but also the IRD_ID of the IRD1 are transmitted to the carrier to let the carrier know that the IRD2 and the IRD1 belong to the same group (step S4).

The carrier (transmitting end) assigns the same IRD_Gr_ID to the IRD1 and the IRD2 and transmits it to the IRDs. On receipt of the IRD_Gr_ID, the IRD1 and the IRD2 store this in nonvolatile memories, respectively. If the IRD_Gr_ID can be transmitted not only through the EMM but also through another transmission path such as a telephone line, the receiving end can receive it with higher reliability. Therefore, the IRD_Gr_ID is not necessarily transmitted through the EMM, and it may be transmitted by any means as long as it is paired with the IRD_ID so that the receiver can recognize the IRD to which the IRD_Gr_ID is assigned.

Further, the carrier (transmitting end) transmits the EMM containing the same contract information as that transmitted to the IRD1, toward the IRD2 (step S5). That is, the same key information as that transmitted to the IRD1 and the group-unit management information list A shown in FIG. 2(*a*) are transmitted to the IRD2. The content of the group-unit management information list A transmitted to the IRD2 is identical to that of the IRD-unit management information list B transmitted to the IRD1 except that the IRD_Gr_ID is listed instead of the IRD_ID. Since the contract has been changed from the IRD-unit contract to the group-unit contract, the group-unit management information list A is transmitted to the IRD1, instead of the IRD-unit management information list B.

The IRD2 receives, with the tuner 31, a signal of a data stream transmitted by digital broadcasting. In the IRD2, the demodulator 32 demodulates this signal, and the error correction unit 33 corrects the transmission line error by using an error correction code for correcting the bit error. The demultiplexer 35 extracts the EMM from the error-corrected data stream. The controller 36 obtains the EMM to recognize the fee-charged channels (services) for which the contract is made, with reference to the management information list A, and extracts the key information from the EMM. Further, the controller 36 instructs the descrambler 34 to descramble the video and audio data of the program (event) of the contract channel (service), through the card interface 72, on the basis of the key information recorded in the card 71 and the key information extracted from the EMM. Further, the demultiplexer 35 separates the descrambled video and audio data from the data stream, and the video and audio decoder 38 decodes the separated data. The decoded video is displayed on the video display unit 39 while the decoded audio is output through the audio output unit 40. That is, the IRD2 descrambles the scrambled video and audio data according to the recognized contract information to permit the viewer to watch the same channel as that for which the IRD1 has already made the contract. Since the receiving end knows the content of the management information list A, it may be entered by the user, instead of being transmitted from the transmitting end.

Further, the IRD1 and the IRD2 notify the customer control center of their own IRD_ID and the IRD_Gr_ID to which they belong, through the telephone line at predetermined time intervals (step S7). The IRD1 and the IRD2 transmit these data at different time intervals.

The customer control center collates the IRD_ID and the IRD_Gr_ID notified through the telephone line with the telephone line number, the IRD_ID, and the IRD_Gr_ID which have been registered at the contract (step S8).

On receipt of the result of the collation from the customer control center, when the collation has succeeded, the carrier waits for notification from the next IRD. When the collation has failed (e.g., when the IRD is not connected to the registered telephone line number but connected to another telephone line number to be used in another home), this IRD breaches the group-unit contract that the IRD should be used in the same group of IRDs connected to the same telephone line and, therefore, the carrier (transmitting end) sends a warning message to the IRD which breaches the contract.

In the data transmission and reception method shown in FIG. 4, the IRD-unit contract is made with respect to the first IRD, and the group-unit contract is made only when the viewer has bought the second (or more) IRD to own plural IRDs. However, when the viewer makes the contract for the first IRD, it may be the group-unit contract expecting purchase of the second (or more) IRD. That is, in this case, the IRD_Gr_ID is assigned to only the IRD1 in step S2, and the IRD_Gr_ID which has already been assigned to the IRD1 is transmitted to the IRD2 in step S5.

As described above, in the data transmission and reception method of the first embodiment, a plurality of data receivers which have different ID numbers and belong to the same group are assigned the same group ID number, and the reception contract is managed according to the respective ID numbers or the group ID number. Therefore, the transmitting end can perform accounting in either contract system, i.e., the IRD-unit contract or the group-unit contract. When the reception contract is the group-unit contract, the receiving end can receive the data with plural receivers at the charge of one contract.

Further, since the reception contract is updated periodically, it can be changed between the IRD-unit contract and the group-unit contract, resulting in more flexible setting of contract.

Furthermore, in the data receiver as a digital broadcast receiver, a predetermined portion of a broadcast data stream which has been viewed for a predetermined period of time is subjected to accounting. Therefore, highly flexible setting is realized not only in the contract system but also in the accounting system.

Moreover, since the portion of the data stream is a service (channel), it is possible to collect the charge by adopting the group-unit contract in the accounting system of pay-per-channel.

Further, the content of the reception contract includes services which can be viewed at the receiving end and the term of the contract, and they are multiplexed in the data stream to be transmitted to the receiving end. Therefore, the receiving end can receive only the viewable services by descrambling the data stream on the basis of the content of the contract.

Further, the data transmission and reception method of this first embodiment includes the following steps: notifying the transmitting end of the individual ID number possessed by the first receiver (IRD1); notifying the transmitting end of the ID information of a service for which the first receiver makes a reception contract; notifying the transmitting end of the individual ID number possessed by the receiver (IRD2) which belongs to the same group as the first receiver, and that these receivers belong to the same group; assigning the same group ID number to the receivers which belong to the same group; and inputting the ID information of the service for which the first receiver (IRD1) has made the reception contract, to the receiver (IRD2). Therefore, the viewer can receive and view the service for which the first receiver (IRD1) has made a reception contract, with the plural receivers (IRD1 and IRD2) belonging to the same group as the first receiver, at the charge of one contract.

Further, the method includes the following steps: notifying the transmitting end of the telephone line number connected to the first receiver (IRD1); notifying the transmitting end of the individual ID numbers of the receivers (IRD1 and IRD2) which are connected to the same telephone line, and the group ID number of these receivers, at predetermined time intervals, from the connected telephone line number; and collating these numbers with the numbers which have already been registered at the transmitting end. Therefore, if a receiver under the group-unit contract is not used within the group, the transmitting end can grasp this fact.

Further, in the step of inputting the ID information of the service for which the first receiver (IRD1) has made the reception contract, to the receiver (IRD2), the information output from the transmitting end is input to the receiver. This saves the user from inputting the information at the receiving end, whereby input errors are avoided.

Further, in the step of collating the transmitted ID numbers with the registered ID numbers at the transmitting end, when these numbers do not match, the transmitting end gives a warning to the receiving end. Therefore, if the receiving end continues the breach of contract even after the warning, it is easy for the transmitting end to take action against the breach, such as abortion of services to the receiver breaching the contract or all of the receivers in the corresponding group.

Further, in the step of assigning the same group ID number to the receivers which belong to the same group, the group ID number is multiplexed in the data stream together with the video and audio data to be transmitted to the receivers. Therefore, the group ID number can be easily transmitted together with the data.

Further, since the group ID number is stored in the EMM of the data stream to be transmitted, the group ID number can be easily transmitted in a pair with the IRD_ID which has conventionally been transmitted.

Further, since the group ID number can be transmitted to the receiver through a transmission line different from the data stream, highly reliable transmission is realized by using a transmission line of less jamming, such as a telephone line.

The receiver according to this first embodiment comprises the following units: the storage unit for storing the group ID number transmitted from the transmitting end; the demultiplexer for extracting information about the reception contract from the transmitted data stream; the controller for analyzing the extracted information about the reception contract to recognize the receivable service, and instructing the demultiplexer to extract the key information for descrambling the receivable service from the data stream; and the descrambler for descrambling the receivable service from the data stream, according to the instruction from the controller, based on the information including the recognized receivable service and the extracted key information. Therefore, the user (group) can receive and view the service with plural receivers belonging to the same group, at the charge of one contract.

Furthermore, the receiver further includes the upstream controller for notifying the transmitting end of the individual ID number of the receiver and the group ID number, through the telephone line connected to the receiver, at predetermined time intervals. Therefore, if a receiver under the group-unit contract is not used within the group, the transmitting end can grasp this fact.

While in this first embodiment one group possesses two IRDs (IRD1 and IRD2), one group may possess three or more IRDs with the same effects as described above.

Embodiment 2

A data transmission and reception method according to a second embodiment of the present invention employs the accounting system of pay-per-view (PPV). Also in this second embodiment, IRD_Gr_ID is stored in an EMM section when it is transmitted, as shown in FIG. 1 according to the first embodiment.

FIG. 5 is a diagram illustrating an example of PPV_Group_descriptor to be transmitted from the transmitting end in the data transmission and reception method according to this second embodiment of the invention.

In FIG. 5, 61 denotes PPV_Group_descriptor which describes information for distinguishing the PPV accounting system between the IRD-unit accounting and the group-unit accounting. More specifically, since PPV is an accounting system of collecting the charges of programs which have been viewed, the carrier adopts the group-unit contract for an ordinary program and collects the charge of this program for one IRD even if the program has been viewed with plural IRDs in the same group. However, with respect to a special program the production cost of which is expensive, the carrier may prefer the IRD-unit contract.

Therefore, PPV_Group_descriptor is employed as a descriptor for distinguishing the PPV accounting system between the IRD-unit accounting and the group-unit accounting, for each program. This PPV_Group_descriptor is described in an event information table (EIT) of service information (SI) which is standardized by Association of Radio Industries and Businesses (ARIB).

Further, 62 denotes Group_flag. When this flag is "1", it indicates that group-unit viewing is permitted, and when this flag is "0", it indicates that the IRD-unit contract is adopted.

The structure of the receiver used in the data transmission and reception method of this second embodiment is fundamentally identical to that shown in FIG. 3.

However, the cards 51 and 71 store the history of viewing relating to the program displayed by the corresponding IRD, such as the program ID for identifying the program and the display time.

Figure 6:
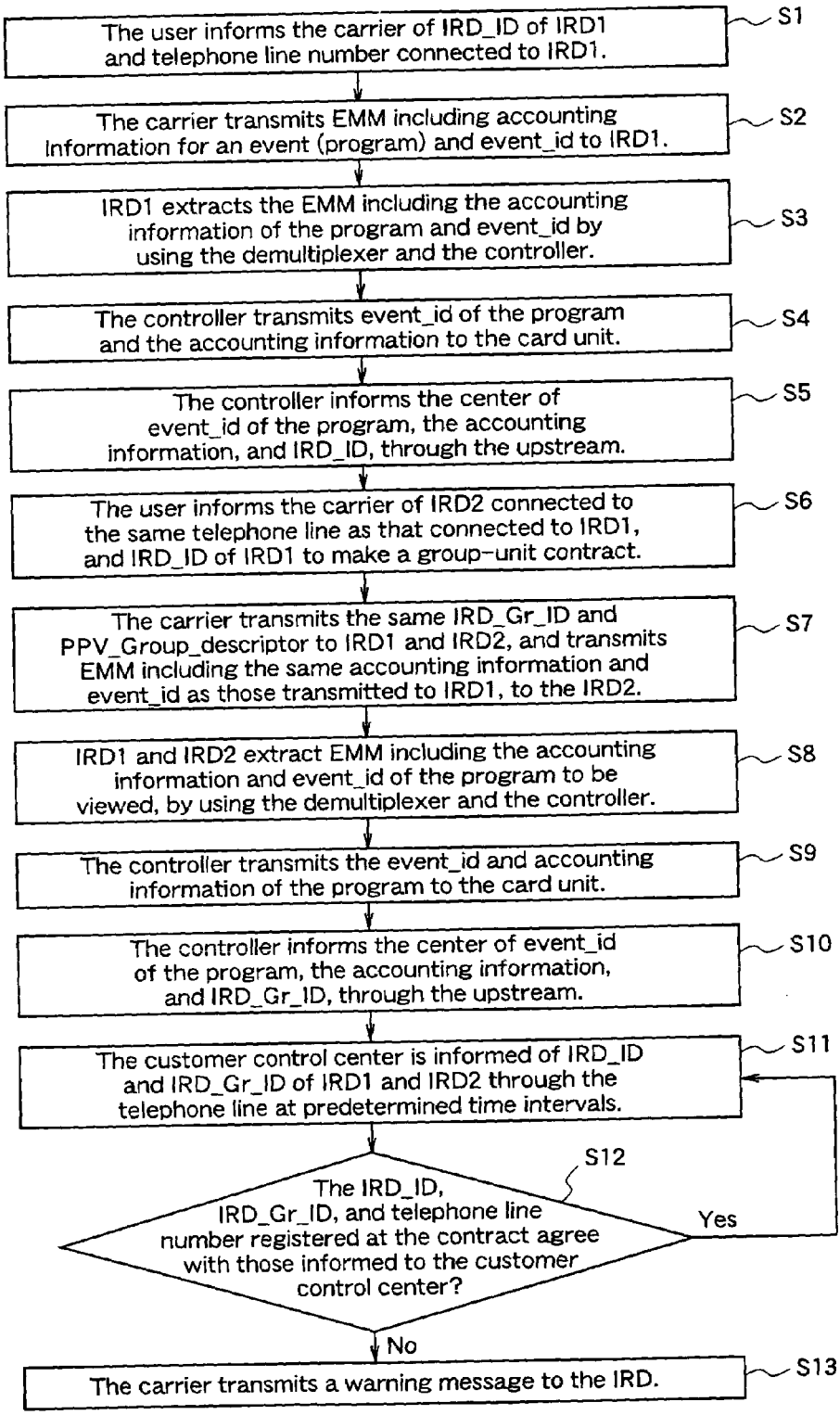
FIG. 6 is a flowchart for explaining an example of the data transmission and reception method according to the second embodiment.

FIG. 6 is a flowchart for explaining an example of the data transmission and reception method according to the second embodiment.

Hereinafter, the data transmission and reception method according to the second embodiment will be described with reference to FIGS. 1, 3, 5 and 6.

Initially, when a viewer A has bought a first IRD (IRD1), the viewer makes a contract with a carrier. At this time, the viewer A notifies the carrier of the IRD_ID of the IRD1 and the telephone line number connected to the IRD1 (step S1).

The carrier (transmitting end) transmits the EMM shown in FIG. 1(a) or 1(b) to the IRD1 (step S2). This EMM includes the accounting information of an event (program), and event_id.

The IRD1 receives, with the tuner 11, a signal of a data stream transmitted by digital broadcasting. In the IRD1, the demodulator 12 demodulates this signal, and the error correction unit 13 corrects the transmission line error by using an error correction code for correcting the bit error. Then, the demultiplexer 15 extracts the EMM from the error-corrected data stream (step S3).

Next, the controller 16 obtains the EMM, extracts the key information from the EMM, and transmits the accounting information of the event (program) to be viewed and the event_id to the card 51 (step S4).

Further, the controller 16 instructs the descrambler 14 to descramble the video and audio data of the program (event) included in the data stream, through the card interface 52, on the basis of the key information recorded on the card 51 and the key information extracted from the EMM. Further, the demultiplexer 15 separates the descrambled audio and video data from the data stream, and the video and audio decoder 18 decodes the separated data.

The decoded video is displayed on the video display unit 19 while the decoded audio is output through the audio output unit 20. Then, the controller 16 periodically transmits the event_id, the accounting information, and the IRD_ID, which are stored in the card 51, to the customer control center through the upstream (step S5).

When the viewer A has bought a second IRD (IRD2) while using the IRD1, the IRD2 is connected to the telephone line to which the IRD1 is connected, and the IRD-unit contract for the IRD1 is changed to a group-unit contract for the IRD1 and the IRD2. At this time, not only the IRD_ID of the IRD2 but also the IRD_ID of the IRD1 are transmitted to the carrier to let the carrier know that the IRD2 and the IRD1 belong to the same group (step S6). Although the contract is changed to the group-unit contract, the IRD-unit contract may be applied depending on the event (program) as described above.

The carrier (transmitting end) assigns the same IRD_Gr_ID to the IRD1 and the IRD2, and transmits the PPV_Group descriptor shown in FIG. 5 to these IRDs. On receipt of the IRD_Gr_ID, the IRD1 and the IRD2 store this in nonvolatile memories, respectively. If the IRD_Gr_ID can be transmitted not only through the EMM but also through another transmission line such as a telephone line, the receiving end can receive it with higher reliability.

Further, the carrier (transmitting end) transmits the EMM containing the accounting information of the event (program) and the event_id to the IRD2 (step S7).

The IRD2 receives, with the tuner 31, a signal of a data stream transmitted by digital broadcasting. In the IRD2, the demodulator 32 demodulates this signal, and the error correction unit 33 corrects the transmission line error by using an error correction code for correcting the bit error. The demultiplexer 35 extracts the EMM from the error-corrected data stream (step S8).

Next, the controller 36 obtains the EMM, extracts the key information from the EMM, and transmits the accounting information of the event (program) and the event_id to the card 71 (step S9).

Further, the controller 36 instructs the descrambler 34 to descramble the video and audio data of the program (event) included in the data stream, through the card interface 72, in accordance with the key information recorded on the card 71 and the key information extracted from the EMM. Further, the demultiplexer 35 separates the descrambled video and audio data from the data stream, and the video and audio decoder 38 decodes the separated data.

The decoded video is displayed on the video display unit 39 while the decoded audio is output through the audio output unit 40. In the above-mentioned steps S8 and S9, the IRD1 operates in the same manner as the IRD2 to display the same event (program). That is, the IRD1 performs the same operation as described with respect to the steps S3 and S4.

Next, the controller 36 periodically transmits the event_id, the accounting information, and the IRD_Gr_ID, which are stored in the card 71, through the upstream to the customer control center (step S10).

Also in the step S10, the IRD1 operates as described with respect to the step S5, in the same manner as the IRD2.

Meanwhile, the PPV_Group_descriptor is transmitted to the IRD1 and the IRD2 as described above, and the user can know, from the value ("1" or "0") of the Group_flag, whether the group-unit viewing is permitted with respect to the event (program) the user has viewed (i.e., only the charge for one IRD is collected even if the event has been viewed with plural IRDs in the group) or only the IRD-unit viewing is permitted. This may be displayed on the screen before displaying the event (program) to be viewed so that the user can previously know the accounting system on the event.

When the group-unit viewing is permitted with respect to the same event (program) received by the IRD1 and the IRD2, the carrier confirms that this event (program) has been viewed with the IRD1 and the IRD2 which belong to the same group, in accordance with the IRD_Gr_ID and the event_id transmitted from the IRD1 and the IRD2. Then, the carrier applies the group-unit contract to this case, and accounts to the user for the charge of the event (program) viewed by one IRD.

While in the steps S7 through S10 event_id is used as information for specifying an event (program), this information is not restricted thereto. For example, the title of the program, or the broadcast start time and end time may be used.

Further, the IRD1 and the IRD2 notify the customer control center of their IRD_ID and the IRD_Gr_ID to which they belong, through the connected telephone line, at predetermined time intervals (step S7). The IRD1 and IRD2 notify these data at different time intervals, respectively.

The customer control center collates the IRD_ID and the IRD_Gr_ID notified through the telephone line with the telephone line number, the IRD_ID, and the IRD_Gr_ID registered at the contract (step S8).

The carrier receives the result of the collation from the customer control center. When the collation has succeeded, the carrier waits for notification from the next IRD. When the collation has failed (e.g., when the IRD is not connected to the registered telephone line number but connected to another telephone line number to be used in another home), this IRD breaches the group-unit contract that the IRD should be used in the same group of IRDs connected to the same telephone line and, therefore, the carrier (transmitting end) sends a warning message to the IRD which breaches the contract.

As described above, in the data transmission and reception method according to the second embodiment, the same group ID number is assigned to plural data receivers which have different ID numbers and belong to the same group, and the reception contract is managed on the basis of the respective ID numbers or the group ID number. Therefore, the transmitting end can account to the receiving end by either contract system, i.e., the IRD-unit contract or the group-unit contract, and the receiving end can receive the data with plural receivers at the charge of one contract when the reception contract is the group-unit contract.

Further, since the reception contract is updated periodically, the contract system can be changed between the IRD-unit contract and the group-unit contract, resulting in more flexible setting of contract.

Furthermore, in the data receiver as a digital broadcast receiver, a predetermined portion of a broadcast data stream which has been viewed for a predetermined period of time, is subjected to accounting. Therefore, highly flexible setting is realized not only in the contract system but also in the accounting system.

Moreover, since the portion of the data stream is an event (program), it is possible to collect the charge by adopting the group-unit contract in the accounting system of pay-per-view (PPV).

The data transmission and reception method according to the second embodiment comprises the following steps: notifying the transmitting end of the individual ID number possessed by the first receiver (IRD1); notifying the transmitting end of the individual ID number possessed by the receiver (IRD2) which belongs to the same group as the first receiver (IRD1), and that these receivers belong to the same group; assigning the same group ID number to the receivers (IRD1 and IRD2) which belong to the same group; and, when the same event (program) has been viewed with plural receivers having the same group ID number (IRD1 and IRD2), notifying the transmitting end of their individual ID numbers, group ID number, and information specifying this event (program). Therefore, the transmitting end confirms that the same event (program) has been viewed with plural receivers having the same group ID number, and accounts to this group for the charge of this event corresponding to one receiver.

Further, since the information specifying the event (program) includes the program ID number for identifying the event (program), the transmitting end can surely grasp that the events received by the plural receivers are identical.

Further, in the step of assigning the group ID number, the information indicating the accounting system (either the receiver-unit accounting or the group-unit accounting) to be applied to each event (program), is further transmitted. Therefore, when this information is displayed on the screen at the receiving end, the user can previously know the accounting system and change the number of the receivers to be used.

Further, the receiver according to the second embodiment comprises the following units: the storage unit for storing the group ID number transmitted from the transmitting end; the demultiplexer for extracting the history of viewing from the transmitted data stream; the card for storing the extracted history of viewing; and the card interface for transmitting the history of viewing, IRD_ID, and IRD_Gr_ID to the external control center. Since the receiving end can notify the external control center that the same event (program) has been viewed with plural receivers which belong to the same group, the user (group) can view the event (program) for which the group-unit viewing is permitted, at the charge corresponding to one receiver.

Further, the receiver further includes the upstream control unit for notifying the transmitting end of the individual ID number of the receiver and the group ID number, at predetermined intervals, through the telephone line connected to the receiver. Therefore, if a receiver under the group-unit contract is not used within the group, the transmitting end can grasp this fact.

While in this second embodiment one group possesses two IRDs (IRD1 and IRD2), one group may possess three or more IRDs with the same effects as described above.

APPLICABLE FIELD IN INDUSTRY

In a data transmission and reception system according to the present invention, accounting for received fee-charged data is performed according to the content of contract, whereby highly-flexible accounting can be performed according to whether the data is received in units of receivers or in units of groups each having plural receivers.

The invention claimed is:

1. A data stream transmission and reception method for receiving data from a transmitting end, in accordance with a reception contract, by plural receivers that have individual ID numbers and belong to the same group, said transmitting end assigning the same group ID number to the plural receivers, and managing the reception contract on the basis of the individual ID numbers or the group ID number, said method comprising:
   notifying the transmitting end of the individual ID number possessed by a first receiver among the plural receivers that belong to the same group;
   notifying the transmitting end of ID information that can identify a service with which the first receiver tries to make a reception contract;
   notifying the transmitting end of the individual ID numbers possessed by one or plural receivers that belong to the same group as the first receiver, and that the one or plural receivers belong to the same group as the first receiver;
   assigning the same group ID number to the first receiver and the first or plural receivers by the transmitting end that has received the notification;
   inputting the ID information of the service with which the first receiver makes a reception contract, to the first or plural receivers; and
   wherein said first individual ID number notification further comprises notifying the transmitting end of a telephone line number that is connected to the first receiver; and
   in said additional individual ID number notification, the one or plural receivers belong to the same group as the first receiver, and are connected by the same telephone line as the first receiver;
   said notifying the transmitting end of a telephone line number comprising:
   notifying the transmitting end of the individual ID number and the group ID number possessed by at least the self receiver, from each receiver, through the telephone number line connected to the corresponding receiver at predetermined time intervals; and
   collating individual ID numbers, group ID numbers, and telephone line numbers which have already been held by the transmitting end, with the individual ID numbers and the group ID number that are notified from the telephone line number at the predetermined time intervals, with respect to the plural receivers that belong to the same group.

2. A data stream transmission and reception method as defined in claim 1, wherein inputting the ID information of the service with which the first receiver makes a reception contract, which ID information is transmitted from the transmitting end.

3. A data stream transmission and reception method as defined in claim 1, further comprising sending a warning to the receiver side from the transmitting end, when the collating is not matched by the ID number collation.

4. A data stream transmission and reception method as defined in claim 1, wherein said group ID number assigning multiplexes the group ID number onto a data stream together with video and audio to transmit the same to the receiver.

5. A data stream transmission and reception method as defined in claim 4, wherein said group ID number is stored in Conditional Access ID information of the data stream to transmit the same.

6. A data stream transmission and reception method as defined in claim 1, wherein the group ID number is transmitted to the receiver also by a transmission path different from the transmission path for the data stream.

7. A data stream transmission and reception method for receiving data from a transmitting end, in accordance with a reception contract, by plural receivers that have individual ID numbers and belong to the same group, said transmitting end assigning the same group ID number to the plural receivers, and managing the reception contract on the basis of the individual ID numbers or the group ID number, said method comprising:
   notifying the transmitting end of the individual ID number possessed by the first receiver, among the plural receivers that belong to the same group;
   notifying the transmitting end of the individual ID numbers possessed by one or plural receivers that belong to the same group as the first receiver, and that the one or plural receivers belong to the same group as the first receiver;
   assigning the same group ID number to the first receiver and the first or plural receivers by the transmitting end that has received the notification;
   notifying the transmitting end of information that identifies the viewed event as well as the individual ID numbers possessed by the aforementioned receivers and group ID number when an event is viewed by the plural receivers that belong to the same group and have the same group ID number; and
   wherein said first individual ID number notification further comprises notifying the transmitting end of a telephone line number that is connected to the first receiver; and
   in said additional individual ID number notification, the one or plural receivers belong to the same group as the first receiver, and are connected by the same telephone line as the first receiver;
   said notifying the transmitting end of a telephone line number comprising:
   notifying the transmitting end of the individual ID number and the group ID number possessed by at least the self receiver, from each receiver, through the telephone number line connected to the corresponding receiver at predetermined time intervals; and collating individual ID numbers, group ID numbers, and telephone line numbers which have already been held by the transmitting end, with the individual ID numbers and the group ID number that are notified from the telephone line number at the predetermined time intervals, with respect to the plural receivers that belong to the same group.

8. A data stream transmission and reception method as defined in claim 7, wherein the information that identifies the event includes a program ID number that can identify each event.

9. A data stream transmission and reception method as defined in claim 7, wherein said group ID number assigning includes outputting information indicating which one of accounting modes, a receiver-unit accounting mode or a group-unit according mode, is adopted by each event.

* * * * *